United States Patent
Orji et al.

(10) Patent No.: US 12,044,817 B2
(45) Date of Patent: Jul. 23, 2024

(54) GEOMETRICAL DISTRIBUTION FOR NON-IMPULSIVE SOURCES

(71) Applicant: PGS Geophysical AS, Oslo (NO)

(72) Inventors: Okwudili Orji, Oslo (NO); Walter Sollner, Oslo (NO); Endrias Asgedom, Oslo (NO)

(73) Assignee: PGS Geophysical AS, Oslo (NO)

( * ) Notice: Subject to any disclaimer, the term of this patent is extended or adjusted under 35 U.S.C. 154(b) by 679 days.

(21) Appl. No.: 17/254,229

(22) PCT Filed: Jun. 19, 2019

(86) PCT No.: PCT/US2019/037882
§ 371 (c)(1),
(2) Date: Dec. 18, 2020

(87) PCT Pub. No.: WO2019/246189
PCT Pub. Date: Dec. 26, 2019

(65) Prior Publication Data
US 2021/0270984 A1    Sep. 2, 2021

Related U.S. Application Data

(60) Provisional application No. 62/826,110, filed on Mar. 29, 2019, provisional application No. 62/687,273, filed on Jun. 20, 2018.

(51) Int. Cl.
*G01V 1/38* (2006.01)

(52) U.S. Cl.
CPC .......... *G01V 1/3808* (2013.01); *G01V 1/3835* (2013.01); *G01V 1/3861* (2013.01); *G01V 2210/127* (2013.01); *G01V 2210/1293* (2013.01)

(58) Field of Classification Search
CPC .. G01V 1/3808; G01V 1/3835; G01V 1/3861; G01V 1/3817
See application file for complete search history.

(56) References Cited

U.S. PATENT DOCUMENTS

| | | | |
|---|---|---|---|
| 5,511,040 A | * | 4/1996 | Nyland ................... G01V 1/36 367/40 |
| 10,168,440 B2 | * | 1/2019 | Brune .................... G01V 1/006 |

(Continued)

FOREIGN PATENT DOCUMENTS

| WO | WO 2015/011160 | 1/2015 |
|---|---|---|
| WO | WO 2015/036554 | 3/2015 |

(Continued)

OTHER PUBLICATIONS

International Search Report and Written Opinion for PCT/US2019/037882 dated Sep. 24, 2019.

(Continued)

*Primary Examiner* — Lam S Nguyen

(57) ABSTRACT

A proposed geometrical distribution for a first non-impulsive source and a second non-impulsive source of a source array can be received. A near-field-to-notional computation can be performed for the proposed geometrical distribution to yield a respective computed notional output of the first and second non-impulsive sources. Whether the computed notional output of the first non-impulsive source has a first amount of residue greater than a threshold amount of residue can be determined. Whether the computed notional output of the second non-impulsive source has a second amount of residue greater than the threshold amount of residue can be determined. An indication whether either of the first or second amounts of residue is less than or equal to the threshold amount of residue can be provided.

13 Claims, 7 Drawing Sheets

(56) References Cited

U.S. PATENT DOCUMENTS

| 10,969,509 B2* | 4/2021 | Beitz .................... G01V 1/3817 |
| 2014/0369162 A1 | 12/2014 | Teyssandier |
| 2017/0199292 A1* | 7/2017 | Tønnessen ........... G01V 1/3808 |

FOREIGN PATENT DOCUMENTS

| WO | WO 2016/179060 | 11/2016 |
| WO | WO 2018/026513 | 2/2018 |

OTHER PUBLICATIONS

Ziolkowski, et al., "The Signature of an Air Gun Array: Computation from Near-Field Measurements Including Interactions," Geophysics, vol. 47, No. 10 (SEG, Oct. 1982).

* cited by examiner

GEOMETRICAL DISTRIBUTION FOR NON-IMPULSIVE SOURCES

CROSS-REFERENCE TO RELATED APPLICATIONS

This application is a 35 USC 371 national stage entry of, and claims priority to, International Application PCT/US2019/037882, filed Jun. 19, 2019, which itself claims priority to U.S. Provisional Patent Application 62/687,273, filed Jun. 20, 2018 and U.S. Provisional Patent Application No. 62/826,110, filed Mar. 29, 2019, each of which is hereby incorporated by reference as if entirely set forth herein.

BACKGROUND

In the past few decades, the petroleum industry has invested heavily in the development of marine survey techniques that yield knowledge of subterranean formations beneath a body of water in order to find and extract valuable mineral resources, such as oil. High-resolution images of a subterranean formation are helpful for quantitative interpretation and improved reservoir monitoring. For a typical marine survey, a marine survey vessel tows one or more marine survey sources (hereinafter referred to as "sources") below the sea surface and over a subterranean formation to be surveyed. Marine survey receivers (hereinafter referred to as "receivers") may be located on or near the seafloor, on one or more streamers towed by the marine survey vessel, or on one or more streamers towed by another vessel. The marine survey vessel typically contains marine survey equipment, such as navigation control, source control, receiver control, and recording equipment. The source control may cause the one or more sources, which can be impulsive sources such as air guns, non-impulsive sources such as marine vibrator sources, electromagnetic sources, etc., to produce signals at selected times. Each signal is essentially a wave called a wavefield that travels down through the water and into the subterranean formation. At each interface between different types of rock, a portion of the wavefield may be refracted, and another portion may be reflected, which may include some scattering, back toward the body of water to propagate toward the sea surface. The receivers thereby measure a wavefield that was initiated by the actuation of the source.

DETAILED DESCRIPTION

Figure 1:
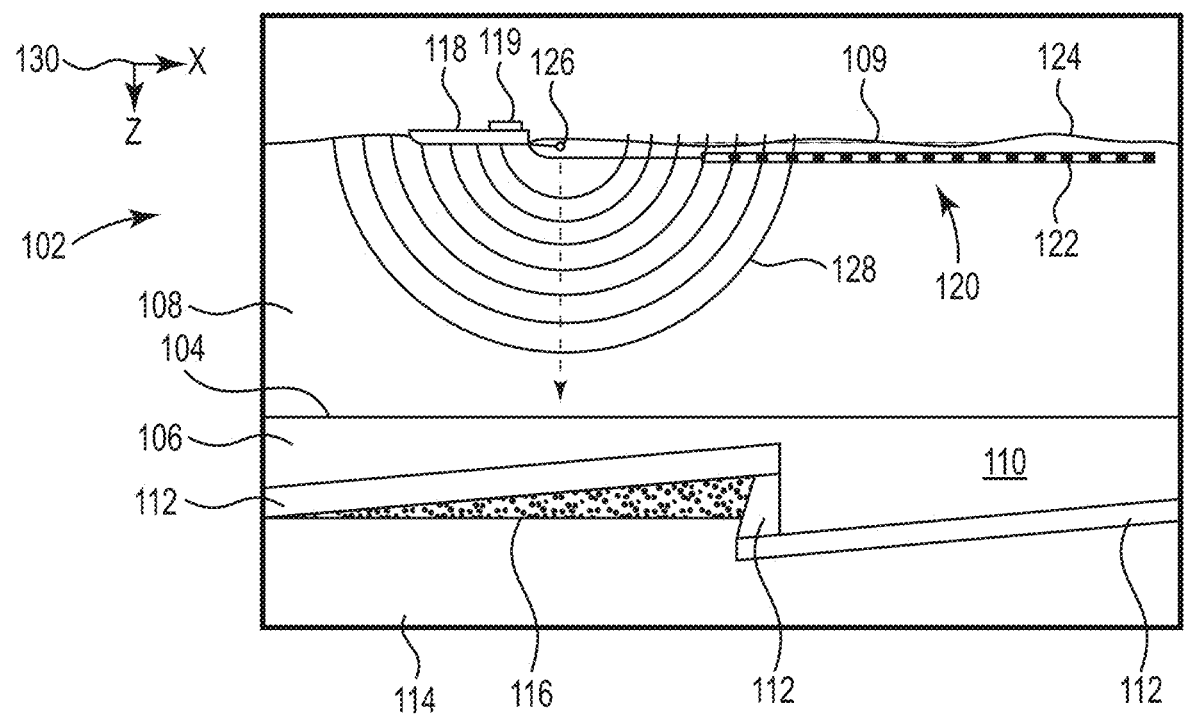
FIG. 1 illustrates an elevation or xz-plane view of marine surveying in which signals are emitted by a source for recording by receivers.

A seismic source is a device that generates controlled acoustic energy used to perform marine surveys based on reflection and/or refraction of the acoustic energy. Seismic sources can be impulsive sources or non-impulsive sources. Examples of impulsive sources include air guns, explosive sources (e.g., dynamite), plasma sound sources, boomer sources, etc. An example of a non-impulsive source is a marine vibrator. A source array is an array of sources towed together by a marine survey vessel. A source array can include a plurality of source sub-arrays, each including a plurality of sources that can be actuated together or separately.

There is a drive to reduce the environmental impact of seismic sources during a marine survey while increasing the efficiency of the marine survey. For marine surveys using impulsive sources, impulsive sources of varying volumes may be arranged into source arrays so that a high peak-to-bubble ratio may be achieved. The impulsive sources may be distributed laterally, such as at different cross-line positions, at the same depth. The energy released from an individual one of the impulsive sources is a broadband frequency spectrum such that the output of the impulsive sources is overlapping for a plurality of frequencies. In order to obtain a signature of an individual impulsive source from the output of the source array, a near-field-to-notional computation, which can include a near-field-to-notional inversion, can be performed to yield a computed notional output for the individual impulsive source. The sea surface reflection contribution of a source and neighboring sources can be removed by the near-field-to-notional inversion.

As used herein, "near-field" refers to an area around a seismic source having a radius around the seismic source that is less than or equal to a wavelength of an acoustic signal generated by the seismic source. "Far-field" refers to an area around a seismic source, beyond the near-field, having a radius greater than a wavelength of an acoustic signal generated by the seismic source. Thus, a "near-field recording" refers to an acoustic signal recorded in the near-field of a seismic source (a "near-field signal") and a "far-field recording" refers to an acoustic signal recorded in the far-field of a seismic source (a "far-field signal"). For example, a near-field signal can be recorded by a receiver located in the near-field of a seismic source, such as the near-field receiver 643 described in association with FIG. 6.

In general, a shape of an acoustic signal recorded in the near-field changes with distance, whereas the shape of the acoustic signal recorded in the far-field does not change with distance. In a far-field recording, both amplitude and phase spectra of an acoustic signal may remain the same in a given direction. The amplitude of the acoustic signal may change with distance; however, in the far-field, the shape of the acoustic signal may not change. From measurement of outputs (for example, acoustic signals) of air guns, it is known that the position of the transition from near-field to far-field can span tens of centimeters from the air guns and that the far-field can begin approximately one meter from the air guns.

The present disclosure is related to determining, for a proposed geometrical distribution, whether a notional output generated from near-field-to-notional computation for a non-impulsive source of a source array has at most a threshold amount of residue from a different non-impulsive source of the source array relative to an amount of energy of the non-impulsive source at the operating frequency band of the non-impulsive source. As used herein, "residue" refers to contamination in a computed notional output of a non-impulsive source from another non-impulsive source. As used herein, "computed notional output" of a source refers to a computed output of the source when the source is actuated and recorded alone with the sea surface contribution of the source removed. As used herein, "modeled notional output" of a source refers to an ideal output of the source when the source is actuated and recorded alone with the sea surface contribution of the source removed without any residue from other sources. A seismic source can be represented by its notional output. Near-field recordings, simulated or measured, can be obtained and then notional outputs for each seismic source of a source array can be computed from the near-field recordings. Herein, such a computation is referred to a "near-field-to-notional computation."

Near-field recordings can be obtained by one or more seismic receivers placed in the near-field of the seismic sources (for example, receivers on streamers or measurement surfaces). Measurement surfaces can be below or above the seismic sources. The near-field recordings can include contributions of the actuated seismic sources, including sea surface reflections of the actuated seismic sources. In an exemplary source array including two impulsive sources, the near-field recording of one of the impulsive sources can include pressure variations caused by the other impulsive source, and vice versa. Computed notional outputs of the two impulsive sources can be based on the near-field recordings of the two impulsive sources. Similarly, as described herein, in an exemplary source array including two non-impulsive sources, the near-field recording of one of the non-impulsive sources can include pressure variations caused by the other non-impulsive source, and vice versa. Computed notional outputs for the two non-impulsive sources can be based on the near-field recordings of the two non-impulsive sources.

A near-field-to-notional computation for a source array of impulsive sources can be based on an assumption that the output of the source array is represented by a system of independent linear equations representing the individual outputs of the individual impulsive sources and their respective sea surface reflections. The near-field-to-notional computation can disentangle overlapping outputs using, for example, a least-square error method. This can disentangle contributions from the other seismic sources, including sea surface contributions. The computed notional outputs can include residues from the other impulsive sources of the source array as a consequence of the impulsive sources and near-field hydrophones not being adequately distributed in space. Summing all the notional outputs of the impulsive sources can yield a far-field signature for processing data from all the impulsive sources. When the seismic sources are non-impulsive sources, data for each frequency band of a corresponding one of the seismic sources can be processed individually.

After a near-field-to-notional computation, residue from the other sources can become a bottleneck. For instance, a notional output of a first non-impulsive source may have an increased amount of energy outside the operating frequency band of the first non-impulsive source because a second non-impulsive source is so close to the first non-impulsive source that the notional output of the first non-impulsive source is contaminated with energy from the second non-impulsive source within the operating frequency band of the second non-impulsive source. As a result, the system of equations for the near-field-to-notional computation can be indeterminable.

The geometrical position of a non-impulsive source in 3-D space can be defined by an in-line geometrical position of the non-impulsive source, a cross-line position of the non-impulsive source, and a depth of the non-impulsive source. In at least one embodiment, the geometrical position of a non-impulsive source in 3-D space can be defined by an in-line position of the non-impulsive source, a cross-line position of the non-impulsive source, and a depth of the non-impulsive source relative to another non-impulsive source or a marine survey vessel. At least one embodiment of the present disclosure includes using a near-field-to-notional computation to determine whether a geometrical distribution for a source array of non-impulsive sources operating in a plurality of frequency bands results in respective computed notional outputs of the non-impulsive sources having greater than a threshold amount of residue from a non-impulsive source of the source array. At least one embodiment includes an optimization of a geometrical distribution for a source array of non-impulsive sources that determines a geometrical position for each individual non-impulsive source of the source array in three-dimensional (3-D) space based on the respective operating frequency bands and strengths of the non-impulsive sources using near-field-to-notional computations. The optimization can reduce, even minimize, amounts of residue from other non-impulsive sources of the source array.

Impulsive sources, such as air guns, generally output a lower amount of energy at lower frequencies and a higher amount of energy at higher frequencies but output a useful amount of energy over a broad band of frequencies. In contrast, non-impulsive sources, such as marine vibrators, can output a relatively flat amount of energy over a narrower range of frequencies compared to impulsive sources. However, the output of a non-impulsive source does not have to be flat. The shape of an acoustic signal of a non-impulsive source can be controlled to follow any trend or shape. Non-impulsive sources can be controlled so as to sweep, for example, through a narrower band of frequencies than impulsive sources. While non-impulsive sources can have selectable operating frequency bands, the amount of time to produce an output can be greater than the amount of time needed to produce an output with impulsive sources. The non-impulsive sources of an array, operating within different frequency bands, can be actuated concurrently to produce an output for the source array.

The following describes an exemplary near-field-to-notional computation. Assuming n impulsive source bubbles and a receiver such as a hydrophone, placed one meter (m) away from each bubble, a computed notional output of the seismic sources can be based on near-field data associated with the seismic sources as follows:

$$p'_i(t) = \frac{h_j(t)}{s_j} - \sum_{i=1}^{n(i \neq j)} \frac{1}{r_{ij}} \cdot p'_i\left(t - \frac{r_{ij-1}}{c}\right) - \sum_{i=1}^{n} \frac{R}{(r_g)_{ij}} \cdot p'_i\left(t - \frac{(r_g)_{ij} - 1}{c}\right) \quad (1)$$

where $p'_i(t)$ is the ith notional output at a range of one meter, $r_{ij}$ is the distance from the ith bubble to jth receiver, and c is the speed of sound in water. A bubble is a ball of compressed air surrounded by water that is generated responsive to actuation of a source. The bubble expands and collapses as it rises to the sea surface until air in the bubble escapes at the sea surface. The virtual images or the ghosts of the computed notional outputs can be accounted for by the second summation in which the distance $(r_g)_{ij}$ is from the virtual image of the ith bubble to the jth receiver. R is the reflection coefficient, and $s_j$ is the sensitivity of the jth, $h_j$, receiver (volts/bar). R can be $-1$.

Equation (1) can be recast in the frequency domain as:

$$\frac{H_j(\omega)}{s_j} = \sum_{i=1}^{n} P'_i\left[\frac{1}{r_{ij}}\exp\left(-2\pi i\omega \frac{r_{ij}}{c}\right) + \frac{R_{ij}}{(r_g)_{ij}}\exp\left(-2\pi i\omega \frac{(r_g)_{ij}}{c}\right)\right] \quad (2)$$

Equation (2) can be cast in the form of a matrix as follows:

$$H = GP \quad (3)$$

where H and P are both vectors and G can be a square matrix. H, which is also represented as the left-hand terms of Equation (2) can be a measured pressure wavefield as a contribution of all the sources. P can be the computed notional outputs of the individual seismic sources and G can be a wavefield propagator, such as a free space Green function. The computed notional outputs P can be obtained by inverting Equation (3). In at least one embodiment, a far-field signature at a desired location can be computed by propagating and summing the computed notional outputs at the desired location. A drawback of the near-field-to-notional computation for impulsive sources is if the impulsive sources are not adequately distributed, then residual energy from other impulsive sources of the source array may be in the computed notional outputs so as to result in an indeterminable system of independent equations. For example, the distribution of the impulsive sources of the source array may be predefined by the peak-to-bubble ratio, which may restrict the distribution of the impulsive sources. Thus, the computed notional outputs of the impulsive sources may also include some amount of residue.

A source array of non-impulsive sources where at least two of the non-impulsive sources operate within different frequency bands can be analogized to a source array of impulsive sources where at least two of the impulsive sources operate within different frequency bands instead of overlapping bands as described above. Thus, a near-field-to-notional computation, such as that described in association with Equations 1-3, can be performed for a source array of non-impulsive sources to determine an individual output for an individual non-impulsive source. As described above, if the non-impulsive sources are arranged too closely together within the source array, then the near-field-to-notional computation may be indeterminable. Similarly, if the near-field receivers are arranged too closely together, then the near-field-to-notional computation may be indeterminable. A source array including ten non-impulsive sources can have a corresponding system of ten independent equations in a near-field-to-notional computation. But if the non-impulsive sources are too close to one another within the source array, then there may be too few knowns in order to solve the system of equations.

Embodiments of the present disclosure can determine more accurate and precise computed notional outputs of non-impulsive sources that better emulate the outputs of the non-impulsive sources during a marine survey than previous approaches by, prior to performing the marine survey, determining whether a geometrical distribution for a source array of non-impulsive sources results in respective computed notional outputs of the non-impulsive sources having greater than a threshold amount of residue from a non-impulsive source of the source array based on the operating frequency bands and strength of the non-impulsive sources. The computed notional output can be more accurate and precise because the geometrical distribution is determined, prior to using the source array to perform the marine survey, such that the notional output of each non-impulsive source has at most a threshold amount of residue relative to an amount of energy of each non-impulsive source within its operating frequency band. The amount of energy of each non-impulsive source (relative to the threshold amount of residue) can be that of a measured or modeled near-field recording of the non-impulsive source. The geometrical distribution for the non-impulsive sources can then be used to perform a marine survey. Advantageously, at least one embodiment of the present disclosure can enable additional marine surveys to be performed with the non-impulsive sources of the source array arranged according to different geometrical distributions in response to amounts of residue in the notional outputs. At least one embodiment can enable indeterminable notional outputs to be avoided. Whether a geometrical distribution for a source array of non-impulsive sources would result in too much residue in the notional outputs or whether the notional outputs are indeterminable can be identified before that geometrical distribution for the source array is used to perform a marine survey.

The geometrical positions (or geometrical distribution) of the near-field receivers can facilitate the near-field-to-notional computation. For example, if the geometrical positions of the near-field receivers are too close together, then some measurement points may lead to a rank reduction of the system matrix, resulting in failure of the inversion of the system of equations during the near-field-to-notional computation.

In at least one embodiment, an optimal geometrical distribution for non-impulsive sources can be determined having a reduced distance between non-impulsive sources of a source array such that a computed notional output of each non-impulsive source of the source array has at most a threshold amount of residue relative to an amount of energy of each respective non-impulsive source within a respective operating frequency band of each non-impulsive source. The reduced distance can be in a cross-line direction, an in-line direction, or depth, and combinations thereof. The optimization of the geometrical distribution for non-impulsive sources can be performed iteratively to yield a minimal distance between a non-impulsive source of a source array and another non-impulsive source of the source array. A geometrical distribution for non-impulsive sources of a source array in which the non-impulsive sources are close together, but not so close together so as to include residue in the computed notional outputs of the non-impulsive sources as described herein, can be beneficial in reducing the hydrodynamic drag on the source array as the source array is towed by a marine survey vessel, for example. Optimization of a geometrical distribution for non-impulsive sources can include determining whether the computed notional outputs of non-impulsive sources have at most a threshold amount of residue in a first iteration of a geometrical distribution for the non-impulsive sources (a proposed geometrical distribution of the non-impulsive sources). In response to determining that for the first iteration of the geometrical distribution the computed notional outputs would have less than the threshold amount of residue, at least one of the in-line position, cross-line position, and depth of at least one of the non-impulsive sources can be changed to reduce a distance between at least one non-impulsive source and another non-impulsive source of a source array to generate a second iteration of the geometrical distribution (a different geometrical distribution of the non-impulsive sources). At least an in-line distance, a depth difference, or a cross-line distance between at least two non-impulsive sources can be reduced to a minimum value (a minimum in-line distance, a minimum depth difference, a minimum cross-line distance) so that computed notional outputs of the at least two non-impulsive sources have amounts of residue that are less than or equal to the threshold amount of residue.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected and, unless stated otherwise, can include a wireless connection.

The figures herein follow a numbering convention in which the first digit or digits correspond to the drawing figure number and the remaining digits identify an element or component in the drawing. Similar elements or components between different figures may be identified by the use of similar digits. For example, 242 may reference element "42" in FIG. 2, and a similar element may be referenced as 642 in FIG. 6. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 illustrates an elevation or xz-plane 130 view of marine surveying in which signals are emitted by a source 126, such as a non-impulsive source, for recording by receivers 122. According to at least one embodiment of the present disclosure, the source 126 can represent a source array of non-impulsive sources having a determined geometrical distribution such that the notional output of each non-impulsive source has at most a threshold amount of residue relative to an amount of energy of each other non-impulsive source within its operating frequency band. The recording can be used for processing and analysis in order to help characterize the structures and distributions of features and materials underlying the surface of the earth. For example, the recording can be used to estimate a physical property of a subsurface location, such as the presence of a reservoir that may contain hydrocarbons. FIG. 1 shows a domain volume 102 of the earth's surface comprising a subsurface volume 106 of sediment and rock below the surface 104 of the earth that, in turn, underlies a fluid volume 108 of water having a sea surface 109 such as in an ocean, an inlet or bay, or a large freshwater lake. The domain volume 102 shown in FIG. 1 represents an example experimental domain for a class of marine surveys. FIG. 1 illustrates a first sediment layer 110, an uplifted rock layer 112, an underlying rock layer 114, and a hydrocarbon-saturated layer 116. One or more elements of the subsurface volume 106, such as the first sediment layer 110 and the uplifted rock layer 112, can be an overburden for the hydrocarbon-saturated layer 116. In some instances, the overburden may include salt.

FIG. 1 shows an example of a marine survey vessel 118 equipped to carry out marine surveys. In particular, the marine survey vessel 118 can tow one or more streamers 120 (shown as one streamer for ease of illustration) generally located below the sea surface 109. The streamers 120 can be long cables containing power and data-transmission lines (e.g., electrical, optical fiber, etc.) to which receivers may be coupled. In one type of marine survey, each receiver, such as the receiver 122 represented by the shaded disk in FIG. 1, comprises a pair of sensors including a geophone that detects particle displacement within the water by detecting particle motion variation, such as velocities or accelerations, and/or a receiver that detects variations in pressure. In one type of marine survey, each receiver, such as the receiver 122, comprises an electromagnetic receiver that detects electromagnetic energy within the water. The streamers 120 and the marine survey vessel 118 can include sensing electronics and data-processing facilities that allow receiver readings to be correlated with absolute positions on the sea surface and absolute three-dimensional positions with respect to a three-dimensional coordinate system. In FIG. 1, the receivers along the streamers 120 are shown to lie below the sea surface 109, with the receiver positions correlated with overlying surface positions, such as a surface position 124 correlated with the position of receiver 122.

The marine survey vessel 118 can tow one or more sources 126 that produce signals as the marine survey vessel 118 and streamers 120 move across the sea surface 109. Although not specifically illustrated, the sources 126 can include at least one marine impulsive source and at least one marine non-impulsive source. The sources 126 and/or streamers 120 may also be towed by other vessels or may be otherwise disposed in fluid volume 108. For example, the receivers may be located on ocean bottom cables or nodes fixed at or near the surface 104, and the sources 126 may also be disposed in a nearly-fixed or fixed configuration. For the sake of efficiency, illustrations and descriptions herein show receivers located on streamers, but it should be understood that references to receivers located on a "streamer" or "cable" should be read to refer equally to receivers located on a towed streamer, an ocean bottom receiver cable, and/or an array of nodes. Although illustrated as a point, the sources 126 can represent a source string or a source array. The marine survey vessel 118 can include a controller 119. For example, the controller 119 can be coupled to the sources 126 and configured to control deployment and recovery of the sources 126 as described herein.

FIG. 1 shows acoustic energy illustrated as an expanding, spherical signal, illustrated as semicircles of increasing radius centered at the sources 126, representing a down-going wavefield 128, following a signal emitted by the sources 126. For ease of illustration and consideration with respect to the detail shown in FIG. 1, the down-going wavefield 128 may be considered as a combined output of a source array of non-impulsive sources. The down-going wavefield 128 is, in effect, shown in a vertical plane cross section in FIG. 1. The outward and downward expanding down-going wavefield 128 may eventually reach the surface 104, at which point the outward and downward expanding down-going wavefield 128 may partially scatter, may partially reflect back toward the streamers 120, and may partially refract downward into the subsurface volume 106, becoming elastic signals within the subsurface volume 106.

Figure 2:
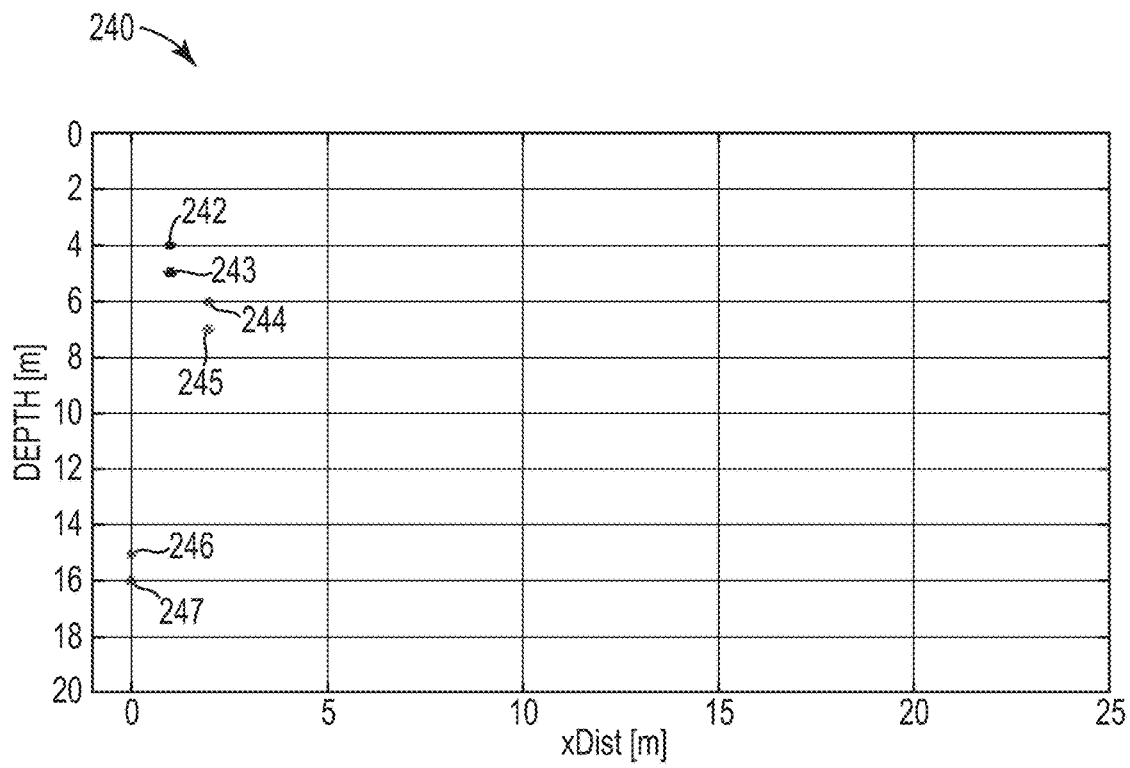
FIG. 2 is a graph illustrating a prior approach to distribution for non-impulsive sources in a source array.

FIG. 2 is a graph 240 illustrating a prior approach to distribution for non-impulsive sources in a source array. The source array represented by the graph 240 includes a low-frequency non-impulsive source 246, a mid-frequency non-impulsive source 244, and a high-frequency non-impulsive source 242. The distribution of the non-impulsive sources 242, 244, and 246 shown in FIG. 2 does not account for potential residue in the notional outputs of the non-impulsive sources 242, 244, and 246. The low-frequency non-impulsive source 246 is at a depth of approximately fifteen meters. The mid-frequency non-impulsive source 244 is at a depth of approximately six meters and at an in-line distance (in the x-direction shown in FIG. 1) of two meters from the low-frequency non-impulsive source 246. The high-frequency non-impulsive source 242 is at a depth of approximately four meters and at an in-line distance of one meter from the low-frequency non-impulsive source 246.

FIG. 2 also illustrates a near-field receiver 247 corresponding to the low-frequency non-impulsive source 246, a near-field receiver 245 corresponding to the mid-frequency non-impulsive source 244, and a near-field receiver 243 corresponding to the high-frequency non-impulsive source 242. The near-field receiver 247 is at a depth of approximately sixteen meters. The near-field receiver 245 is at a depth of approximately seven meters and at an in-line distance (in the x-direction shown in FIG. 1) of two meters from the low-frequency non-impulsive source 246. The near-field receiver 243 is at a depth of approximately five meters and at an in-line distance of one meter from the low-frequency non-impulsive source 246.

Figure 3:
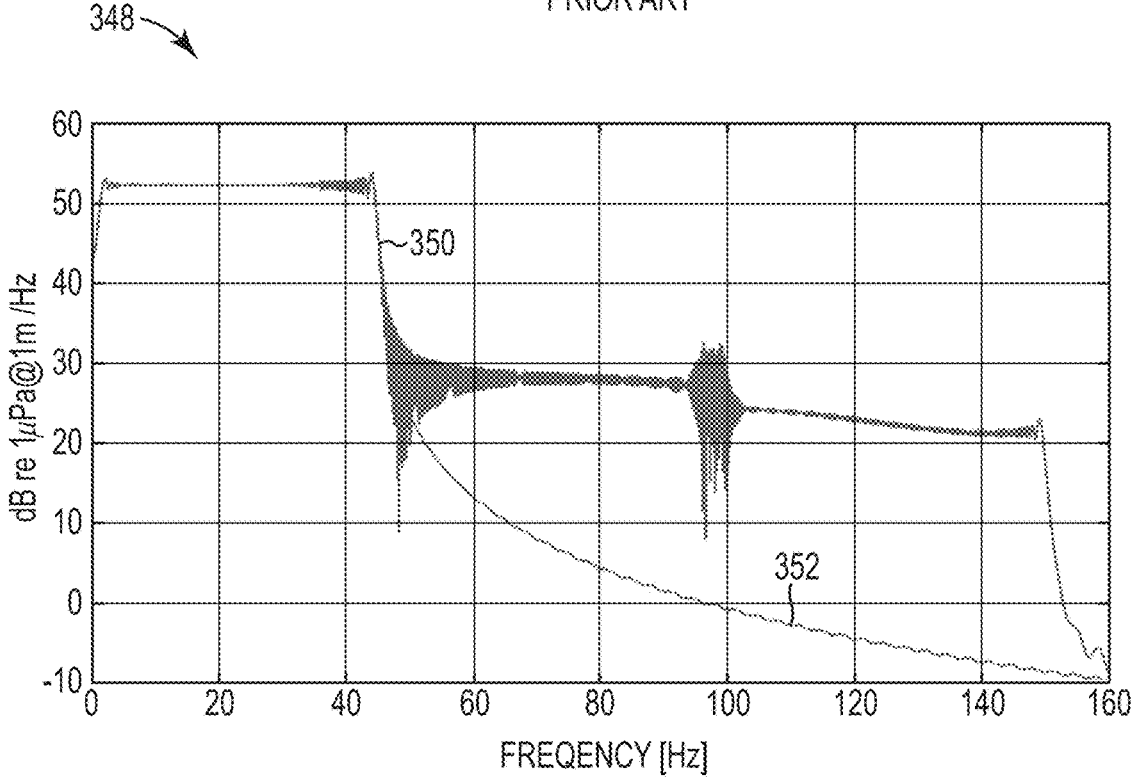
FIG. 3 is a graph illustrating frequency spectra of a low-frequency non-impulsive source in the source array of FIG. 2.

FIG. 3 is a graph 348 illustrating frequency spectra of the low-frequency non-impulsive source 246 in the source array of FIG. 2. The line 352 is the modeled notional output of the low-frequency non-impulsive source 246. Although idealized, the modeled notional output 352 can serve a reference point to illustrate how well a computed notional output of the low-frequency non-impulsive source 246, represented by the line 350, emulates the modeled notional output 352. In the example of FIGS. 2-5, the operating frequency band of the low-frequency non-impulsive source 246 is one to forty-five hertz (Hz). The low-frequency non-impulsive sources can be configured to sweep through a range of frequencies from one to forty-five Hz. The computed notional output 350 has an amount of energy of approximately fifty-two decibels (dB) within the operating frequency band of the low-frequency non-impulsive source 246. However, as shown in FIG. 3, there is a significant amount of residue from contamination of energy from the mid-frequency non-impulsive source 244 and the high-frequency source 242. The computed notional output 350 has an approximate average amount of residue of twenty-eight dB from the mid-frequency non-impulsive source 244 from approximately forty-five to one hundred Hz and an approximate average amount of residue of twenty-four dB from the high-frequency non-impulsive source 242 from approximately one hundred to one hundred fifty Hz. In contrast, the modeled notional output 352 shows a steady decrease in energy from approximately twenty-eight dB at forty-five Hz to approximately zero dB at one hundred Hz.

Figure 4:
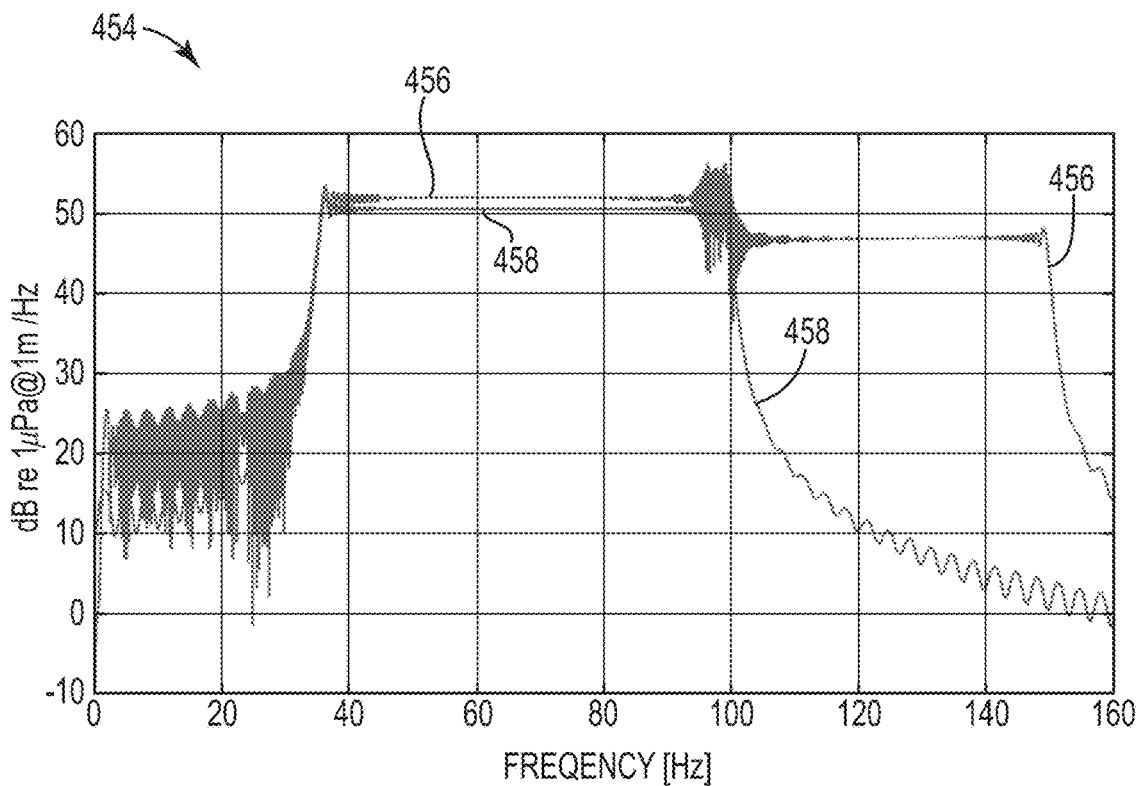
FIG. 4 is a graph illustrating frequency spectra of a mid-frequency non-impulsive source in the source array of FIG. 2.

FIG. 4 is a graph 454 illustrating frequency spectra of the mid-frequency non-impulsive source 244 in the source array of FIG. 2. The line 458 is the modeled notional output for the mid-frequency non-impulsive source 244. Although idealized, the modeled notional output 458 can serve a reference point to illustrate how well a computed notional output of the mid-frequency non-impulsive source 244, represented by the line 456, emulates the modeled notional output 458. In the example of FIGS. 2-5, the operating frequency band of the mid-frequency non-impulsive source 244 is thirty-five to one hundred Hz. The computed notional output 456 has an amount of energy of approximately fifty-two dB within the operating frequency band of the mid-frequency non-impulsive source 244. However, as shown in FIG. 4, there is a significant amount of residue from contamination of energy from the low-frequency non-impulsive source 246 and the high-frequency non-impulsive source 242. The computed notional output 456 has an approximate average amount of residue of twenty dB from the low-frequency non-impulsive source 246 from approximately one to thirty-five Hz and an approximate average amount of residue of forty-seven dB from the high-frequency non-impulsive source 242 from approximately one hundred to one hundred fifty Hz. In contrast, the modeled notional output 458 shows a steady increase in energy from approximately ten dB at zero Hz to twenty dB at thirty Hz and a steady decrease in energy from approximately fifty-two dB at one hundred Hz to approximately zero dB at one hundred sixty Hz.

Figure 5:
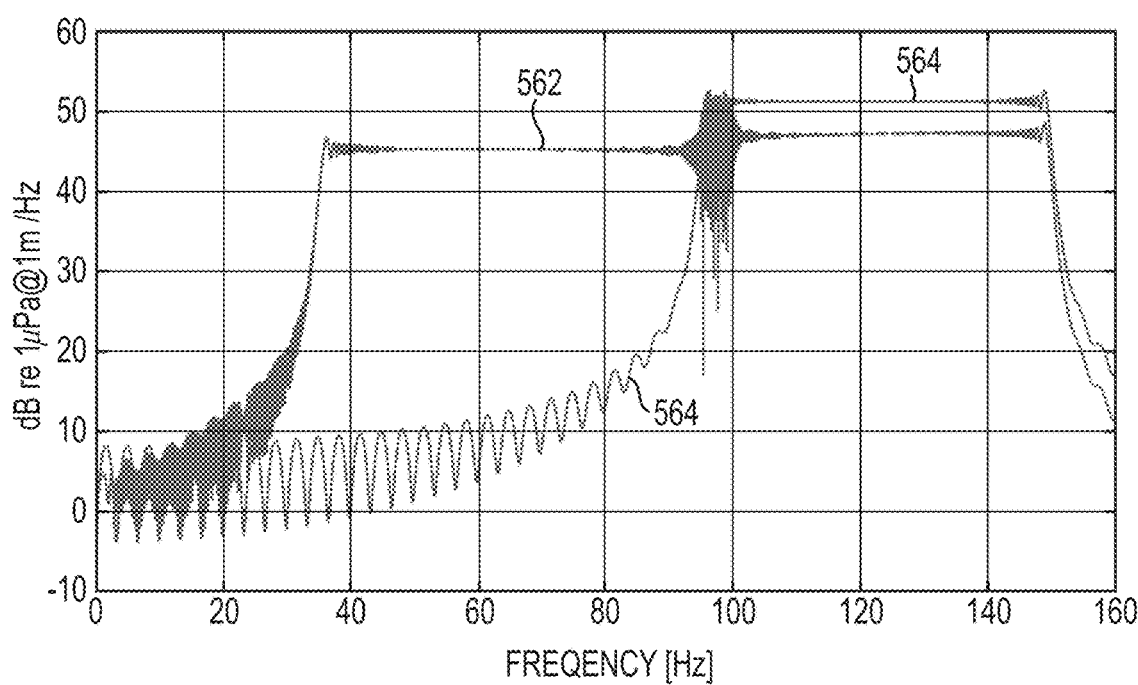
FIG. 5 is a graph illustrating frequency spectra of a high-frequency non-impulsive source in the source array of FIG. 2.

FIG. 5 is a graph 560 illustrating frequency spectra of the high-frequency non-impulsive source 242 in the source array of FIG. 2. The line 564 is the modeled notional output for the high-frequency non-impulsive source 242. Although idealized, the modeled notional output 564 can serve a reference point to illustrate how well a computed notional output of the high-frequency non-impulsive source 242, represented by the line 562, emulates the modeled notional output 564. In the example of FIGS. 2-5, the operating frequency band of the high-frequency non-impulsive source 242 is ninety-five to one hundred fifty Hz. The computed notional output 562 has an amount of energy of approximately forty-eight dB within the operating frequency band of the high-frequency non-impulsive source 242. However, as shown in FIG. 5, there is a significant amount of residue from contamination of energy from the low-frequency source 246 and the mid-frequency non-impulsive source 244. The computed notional output 564 has an approximate amount of residue of ten dB between approximately zero and thirty-five Hz and an approximate average amount of residue of forty-five dB from the mid-frequency non-impulsive source 244 from approximately thirty-five to one hundred Hz. In contrast, the modeled notional output 562 shows fluctuating energy between approximately zero dB and approximately ten dB from zero to forty-five Hz and a steady increase in energy from approximately ten dB at forty-five Hz to approximately forty-eight dB at one hundred Hz.

Figure 6:
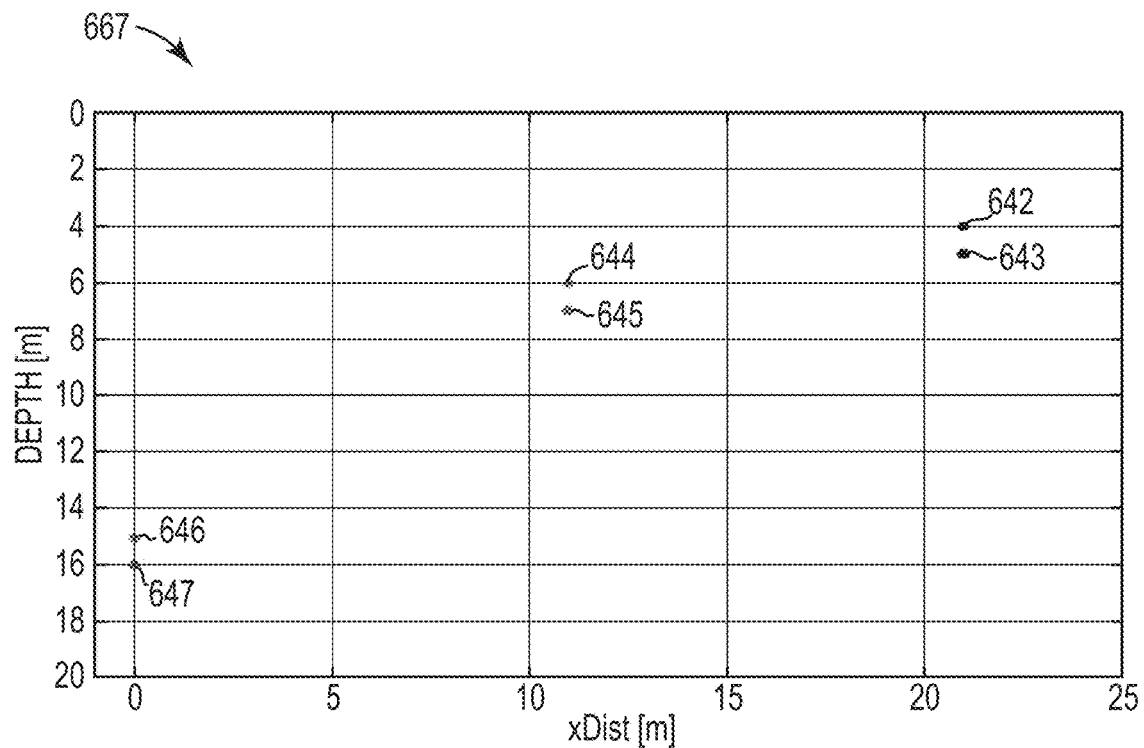
FIG. 6 is a graph illustrating an exemplary geometrical distribution for non-impulsive sources, to be used for performing a marine survey, based on operating frequency bands and strengths of the non-impulsive sources.

FIG. 6 is a graph 667 illustrating an exemplary geometrical distribution for non-impulsive sources, to be used for performing a marine survey, based on frequency bands and strengths of the non-impulsive sources. The source array represented by the graph 667 includes a low-frequency non-impulsive source 646, a mid-frequency non-impulsive source 644, and a high-frequency non-impulsive source 642. The low-frequency non-impulsive source 646, the mid-frequency non-impulsive source 644, and the high-frequency non-impulsive source 642 can each be a source sub-array of the source array represented by the graph 667. In at least one embodiment, the graph 667 can represent the geometrical distribution for non-impulsive sources of a source sub-array. The non-impulsive sources 642, 644, and 646 and the near-field receivers 643, 645, and 647 can be analogous to the non-impulsive sources 242, 244, and 246 and the near-field receivers 243, 245, and 247 described in association with FIG. 2. In the example of FIGS. 6-9, the low-frequency non-impulsive source 646, the mid-frequency non-impulsive source 644, and the high-frequency non-impulsive source 642 can be configured to sweep through a range of frequencies, from one to thirty-five Hz, from thirty-five to one hundred Hz, and from ninety-five to one hundred fifty Hz, respectively. However, embodiments in accordance with the present disclosure are not so limited. For example, one or more of the non-impulsive sources 642, 644, and 646 can be configured to operate at randomized frequencies within a range of frequencies or pseudorandomized frequencies within a range of frequencies. In at least one embodiment, the range of frequencies can be the same as the operating frequency band of the non-impulsive sources.

In contrast to the distribution for the non-impulsive sources 242, 244, and 246 shown in FIG. 2, the geometrical distribution shown in FIG. 6 takes into account potential residue in the computed notional outputs of the non-impulsive sources 642, 644, and 646 by having a threshold amount of residue. In at least one embodiment, the threshold amount of residue can be based on the amount of energy of the computed notional output of a non-impulsive source within the operating frequency band of the non-impulsive source. The amount of energy in the computed notional output of a non-impulsive source can be indicative of the strength of the non-impulsive source. For the exemplary geometrical distribution illustrated by the graph 667, the threshold amount of residue is to be at least thirty dB less than the amount of energy within the operating frequency band of a non-impulsive source. Thus, if the amount of energy within the operating frequency band of the non-impulsive source is fifty dB, then the computed notional output of the non-impulsive source at most can have is thirty dB of residue. In at least one embodiment, the threshold amount of residue can be user-defined. For instance, the threshold amount of residue can be a user-defined quantity, such as at most twenty-five dB, or a user-defined percentage of an amount of energy within the operating frequency band of a non-impulsive source. For example, if the threshold amount of residue is to be no more than 25% of the amount of energy within the operating frequency band of a non-impulsive source and the amount of energy within the operating frequency band of the non-impulsive source is sixty dB, then the computed notional output of the non-impulsive source at most can have fifteen dB of residue. The geometrical distribution represented by the graph 667 can be used to perform a marine survey secure in the knowledge that computed notional outputs for the non-impulsive sources 642, 644, and 646 can be determined with a reduced amount of residue.

The geometrical distribution illustrated by the graph 667 can be a proposed geometrical distribution. As used herein, a "proposed geometrical distribution" refers to an initial geometrical distribution of non-impulsive sources for which a nearfield-to-notional computation is to be performed. As described herein, if the computed notional outputs of the non-impulsive sources have less than or equal to a threshold amount of residue, a different geometrical distribution of the non-impulsive sources can be generated based on the proposed geometrical distribution by changing a depth, in-line position, cross-line position, or combinations thereof of at least one of the non-impulsive sources.

As illustrated in the graph 667, the geometrical distribution includes the low-frequency non-impulsive source 646 at a depth of approximately fifteen meters, the mid-frequency non-impulsive source 644 at a depth of approximately six meters, and at a depth of approximately four meters. The geometrical distribution includes the mid-frequency non-impulsive source 644 at an in-line distance of eleven meters relative to the low-frequency non-impulsive source 646 and the high-frequency non-impulsive source 642 at an in-line distance of twenty-one meters relative to the low-frequency non-impulsive source 646. As described in association with FIGS. 7-9, the geometrical distribution for the non-impulsive sources 642, 644, and 646 allows computed notional outputs of the non-impulsive sources 642, 644, and 646 to have a limited amount of contamination.

FIG. 6 also illustrates the geometrical positions (or geometrical distribution) of the near-field receiver 647 corresponding to the low-frequency non-impulsive source 646, the near-field receiver 645 corresponding to the mid-frequency non-impulsive source 644, and the near-field receiver 643 corresponding to the high-frequency non-impulsive source 642. The near-field receiver 647 is at a depth of approximately sixteen meters. The near-field receiver 645 is at a depth of approximately seven meters and at an in-line distance (in the x-direction shown in FIG. 1) of two meters from the low-frequency non-impulsive source 646. The near-field receiver 643 is at a depth of approximately five meters and at an in-line distance of one meter from the low-frequency non-impulsive source 646. As illustrated by FIG. 6, the respective geometrical positions of the near-field receivers 643, 645, and 647 can be the same distance (for example, one meter) away from the corresponding non-impulsive sources 642, 644, and 646. Although not illustrated in FIG. 6, the near-field receivers 643, 645, and 647 can be positioned on near-field measurement surfaces that are below or above the non-impulsive sources 642, 644, and 646.

Figure 7:
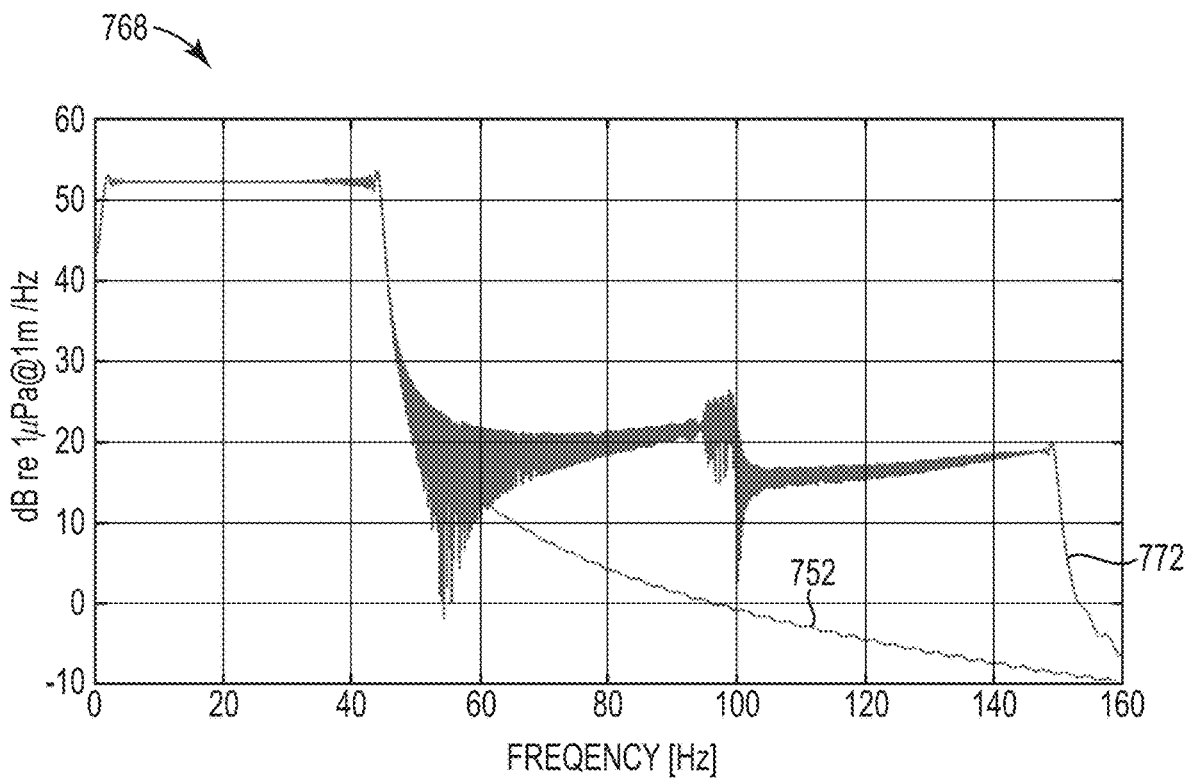
FIG. 7 is a graph illustrating exemplary frequency spectra of a low-frequency non-impulsive source in the geometrical distribution of FIG. 6.

FIG. 7 is a graph 768 illustrating exemplary frequency spectra of the low-frequency non-impulsive source 646 in the geometrical distribution of FIG. 6. The line 752 is the modeled notional output for the low-frequency non-impulsive source 646. Although idealized, the modeled notional output 752 can serve a reference point to illustrate how well a computed notional output of the low-frequency non-impulsive source 646, represented by the line 772, emulates the modeled notional output 752. In the example of FIGS. 6-9, the operating frequency band of the low-frequency non-impulsive source 646 is one to forty-five Hz. The computed notional output 772 has an amount of energy of approximately fifty-two dB within the operating frequency band of the low-frequency non-impulsive source 646. In the example of FIGS. 6-9, the threshold amount of residue is to be at least thirty dB less than the amount of energy within the operating frequency band of a non-impulsive source. Thus, the computed notional output 772 can have at most twenty-two dB (52–30 dB) of residue. Although the computed notional output 772 includes some amount of residue from contamination of energy from the mid-frequency non-impulsive source 644 and the high-frequency source 642, the amount of residue is reduced as compared to the amount of residue in the computed notional output 350 of FIG. 3.

Because the amount of residue in the computed notional output 772 is limited by the threshold amount of residue, the approximate average amount of residue in the computed notional output 772 from the mid-frequency non-impulsive source 644 is twenty dB, eight dB less than the average amount of residue from the mid-frequency non-impulsive source 244 described in association with FIG. 3. The approximate average amount of residue in the computed notional output 772 from the high-frequency non-impulsive source 644 is seventeen dB, nine dB less than the average amount of residue from the high-frequency non-impulsive source 244 described in association with FIG. 3.

Figure 8:
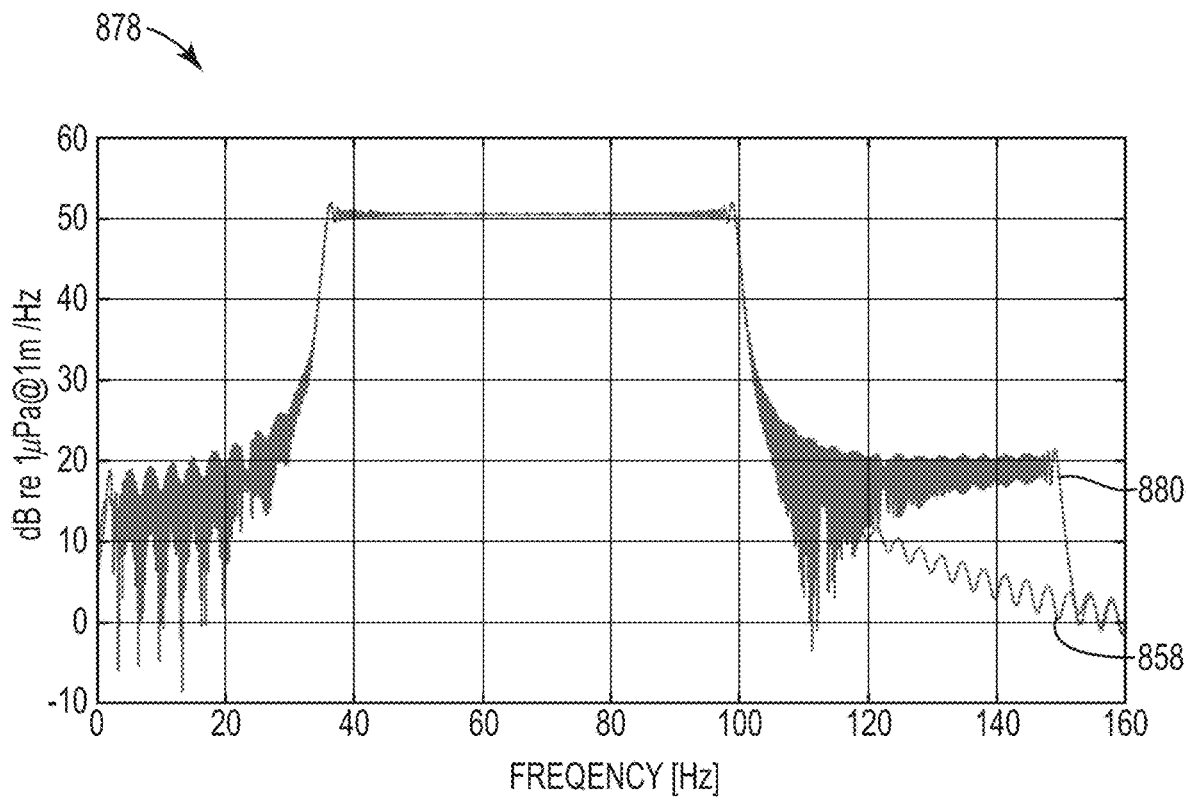
FIG. 8 is a graph illustrating exemplary frequency spectra of a mid-frequency non-impulsive source in the geometrical distribution of FIG. 6.

FIG. 8 is a graph 878 illustrating exemplary frequency spectra of the mid-frequency non-impulsive source 644 in the geometrical distribution of FIG. 6. The line 858 is the modeled notional output for the mid-frequency non-impulsive source 644. Although idealized, the modeled notional output 858 can serve a reference point to illustrate how well a computed notional output of the mid-frequency non-impulsive source 644, represented by the line 880, emulates the modeled notional output 858. In the example of FIGS. 6-9, the operating frequency band of the mid-frequency non-impulsive source 644 is thirty-five to one hundred Hz. The computed notional output 880 has an amount of energy of approximately fifty dB within the operating frequency band of the mid-frequency non-impulsive source 644. In the example of FIGS. 6-9, the threshold amount of residue is to be at least thirty dB less than the amount of energy within the operating frequency band of a non-impulsive source. Thus, the computed notional output 880 can have at most twenty dB (50–30 dB) of residue. Although the computed notional output 880 includes some amount of residue from contamination of energy from the low-frequency non-impulsive source 646 and the high-frequency non-impulsive source 642, the amount of residue is reduced as compared to the amount of residue in the computed notional output 456 of FIG. 4.

Because the amount of residue in the computed notional output 880 is limited by the threshold amount of residue, the approximate average amount of residue in the computed notional output 880 from the low-frequency non-impulsive source 646 is fifteen dB, five dB less than the average amount of residue from the low-frequency non-impulsive source 246 described in association with FIG. 4. The approximate average amount of residue in the computed notional output 880 from the high-frequency non-impulsive source 642 is eighteen dB, twenty-two dB less than the average amount of residue from the high-frequency non-impulsive source 242 described in association with FIG. 4.

Figure 9:
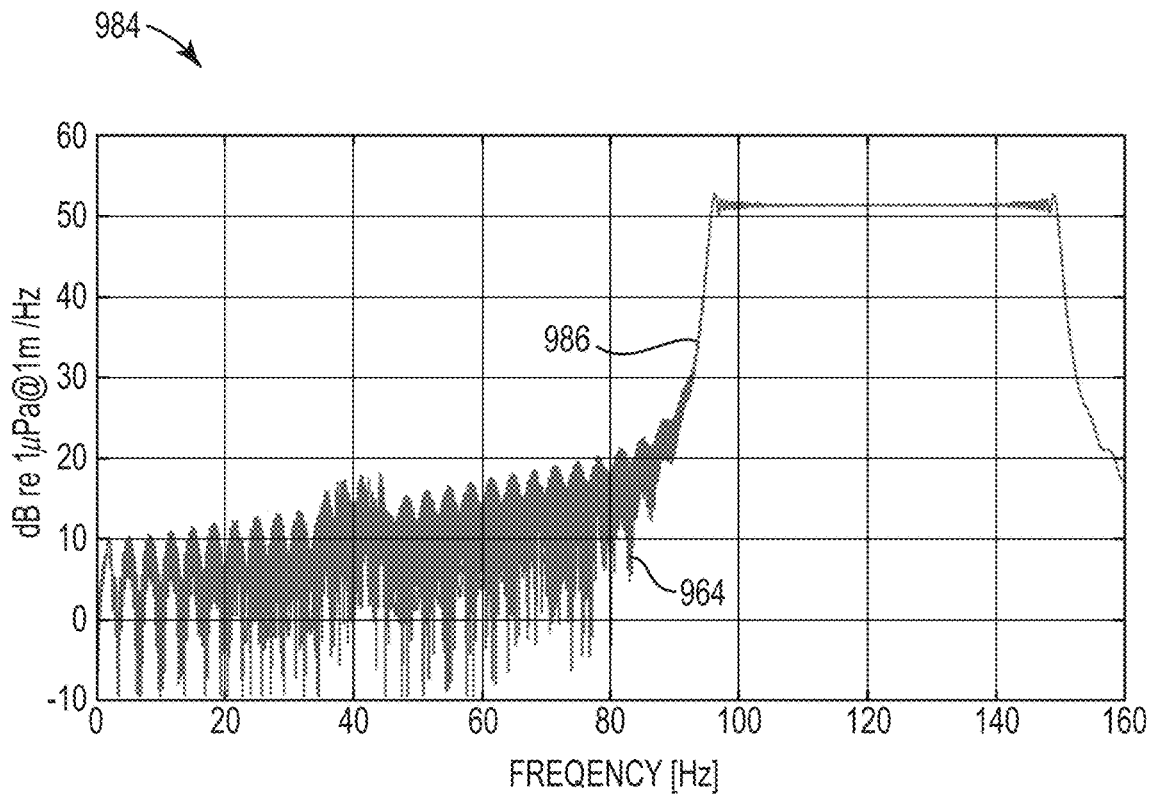
FIG. 9 is a graph illustrating exemplary frequency spectra of a high-frequency non-impulsive source in the geometrical distribution of FIG. 6.

FIG. 9 is a graph 984 illustrating exemplary frequency spectra of the high-frequency non-impulsive source 642 in the geometrical distribution of FIG. 6. The line 964 is the modeled notional output for the high-frequency non-impulsive source 642. Although idealized, the modeled notional output 964 can serve a reference point to illustrate how well a computed notional output of the high-frequency non-impulsive source 642, represented by the line 988, emulates the modeled notional output 964. As discussed further herein, the computed notional output 988 follows the modeled notional output 964 so closely that it is difficult to distinguish the computed notional output 988 from the modeled notional output 964. In the example of FIGS. 6-9, the operating frequency band of the high-frequency non-impulsive source 642 is ninety-five to one hundred fifty Hz. The computed notional output 988 has an amount of energy of approximately fifty-two dB within the operating frequency band of the high-frequency source 642. In the example of FIGS. 6-9, the threshold amount of residue is to be at least thirty dB less than the amount of energy within the operating frequency band of a non-impulsive source. Thus, the computed notional output 988 can have at most twenty-two dB (52–30 dB) of residue. While the computed notional output 988 includes some amount of residue from contamination of energy from the low-frequency non-impulsive source 646 and the mid-frequency non-impulsive source 644, the amount of residue is reduced as compared the amount of residue in the computed notional output 562 of FIG. 5.

Because the amount of residue in the computed notional output 988 is limited by the threshold amount of residue, the approximate average amount of residue in the computed notional output 988 from the low-frequency non-impulsive source 646 is eight dB in the notional output 988, two dB less than the average amount of residue from the low-frequency non-impulsive source 246 described in association with FIG. 5. The approximate average amount of residue in the computed notional output 988 from the mid-frequency non-impulsive source 644 is ten dB, thirty-five dB less than the average amount of residue from the mid-frequency non-impulsive source 244 described in association with FIG. 5.

Although FIGS. 6-9 are described in reference to a two-dimensional (2-D) geometrical distribution for non-impulsive sources based on the depths and in-line positions of the non-impulsive sources, embodiments of the present disclosure are not so limited. For example, embodiments of the present disclosure can include a 2-D geometrical distribution for non-impulsive sources based on depths and cross-line positions of the non-impulsive sources or in-line positions and cross-line positions of the non-impulsive sources. Additionally, embodiments of the present disclosure are not limited to 2-D geometrical distributions of non-impulsive sources. At least one embodiment includes determining a 3-D geometrical distribution for non-impulsive sources based on the depths, in-line positions, and cross-line positions of the non-impulsive sources.

Figure 10:
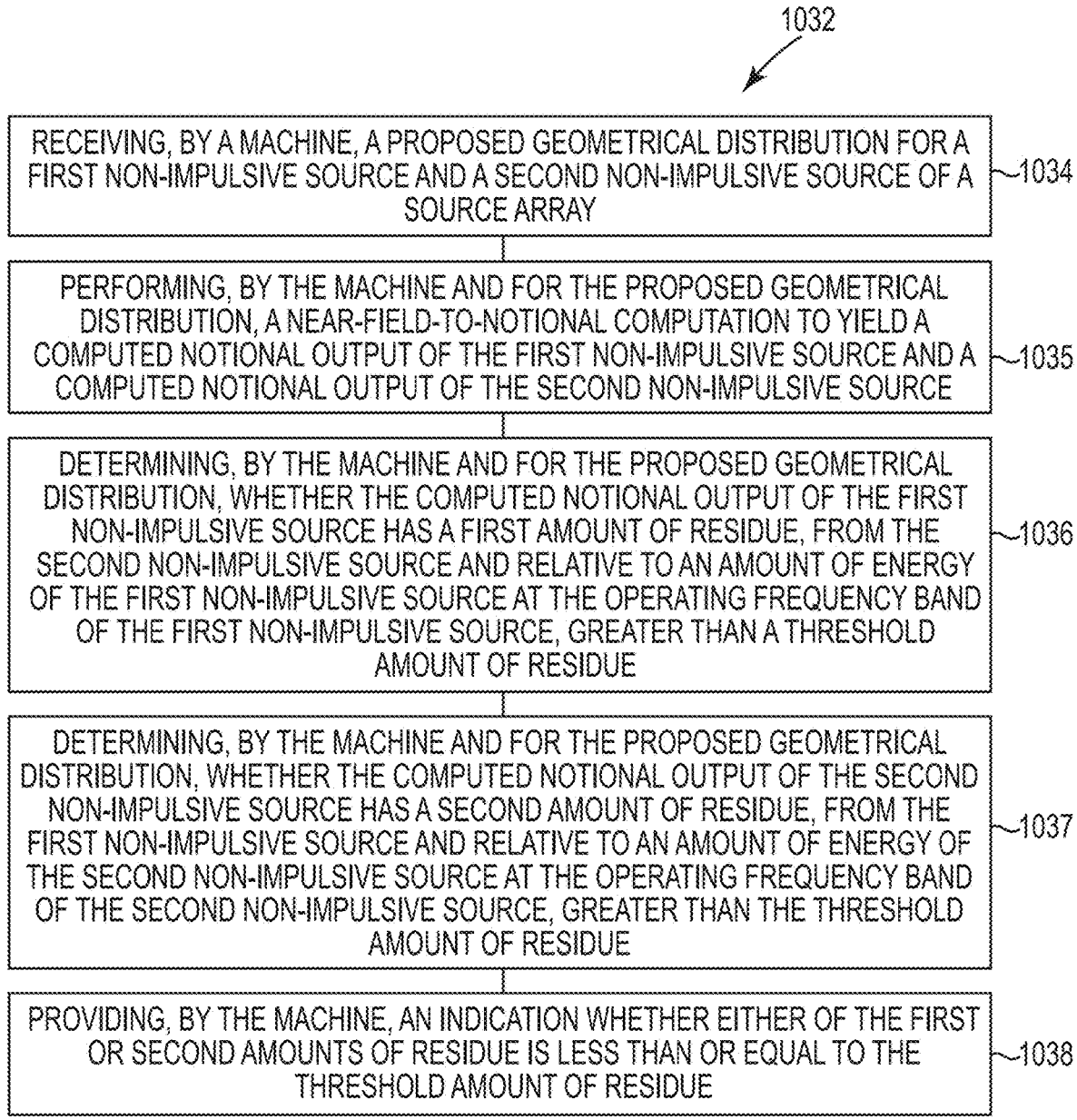
FIG. 10 illustrates an exemplary embodiment of a method for determining geometrical distributions for non-impulsive sources based on operating frequency bands and strengths of the non-impulsive sources.

FIG. 10 illustrates an exemplary embodiment of a method 1032 for determining geometrical distributions for non-impulsive sources based on operating frequency bands and strengths of the non-impulsive sources. In at least one embodiment, the method 1032 can be performed by a machine, such as the machine 1292 described in association with FIG. 12. At 1034, the method 1032 can include receiving, by a machine, a proposed geometrical distribution for a first non-impulsive source and a second non-impulsive source of a source array.

At 1035, the method 1032 can include performing, by the machine and for the proposed geometrical distribution, a near-field-to-notional computation to yield a computed notional output of the first non-impulsive source and a computed notional output of the second non-impulsive source. The near-field-to-notional computation can be based on an inversion of a modeled output of the first non-impulsive source. The near-field-to-notional computation can be based on an inversion of a measured output of the first non-impulsive source.

At 1036, the method 1032 can include determining, by the machine and for the proposed geometrical distribution, whether the computed notional output of the first non-impulsive source has a first amount of residue, from the second non-impulsive source and relative to an amount of energy of the first non-impulsive source at the operating frequency band of the first non-impulsive source, greater than a threshold amount of residue.

At 1037, the method 1032 can include determining, by the machine and for the proposed geometrical distribution, whether the computed notional output of the second non-impulsive source has a second amount of residue, from the first non-impulsive source and relative to an amount of energy of the second non-impulsive source at the operating frequency band of the second non-impulsive source, greater than the threshold amount of residue.

At 1038, the method 1032 can include providing, by the machine, an indication whether either of the first or second amounts of residue is less than or equal to the threshold amount of residue.

Although not illustrated in FIG. 10, in at least one embodiment, the method 1032 can include responsive to providing an indication that the first and second amounts of residue are less than or equal to the threshold amount of residue, performing a marine survey using the proposed geometrical distribution for the first and second non-impulsive sources. In at least one embodiment, the method 1032 can include determining, by the machine, a notional output of the first non-impulsive source based on an inversion of a modeled near-field signal of the first non-impulsive source and determining, by the machine, the amount of energy of the first non-impulsive source at the operating frequency band of the first non-impulsive source based on the determined notional output. In at least one embodiment, the method 1032 can include determining, by the machine, the amount of energy of the first non-impulsive source at the operating frequency band of the first non-impulsive source based on the computed notional output of the first non-impulsive source. In at least one embodiment, the first and second non-impulsive sources can be configured to be operated at different frequencies.

Although not illustrated in FIG. 10, in at least one embodiment, the method 1032 can include responsive to providing an indication that the first and second amounts of residue are less than or equal to the threshold amount of residue, generating, by the machine, a different geometrical distribution for the first and second non-impulsive sources with a reduced distance between the first and second non-impulsive sources and performing, by the machine and for the different geometrical distribution, a different near-field-to-notional computation to yield a different computed notional output of the first non-impulsive source and a different computed notional output of the second non-impulsive source. The method 1032 can include determining, by the machine and for the different geometrical distribution, whether the different computed notional output of the first non-impulsive source has a third amount of residue, from the second non-impulsive source and relative to the amount of energy of the first non-impulsive source at the operating frequency band of the first non-impulsive source, greater than the threshold amount of residue and determining, by the machine and for the different geometrical distribution, whether the different computed notional output of the second non-impulsive source has a fourth amount of residue, from the first non-impulsive source and relative to the amount of energy of the second non-impulsive source at the operating frequency band of the second non-impulsive source, greater than the threshold amount of residue.

In at least one embodiment, the method 1032 can include generating, by the machine, the different geometrical distribution with a minimum distance between the first and second non-impulsive sources such that, for the different geometrical distribution, the third and fourth amounts of residue are less than or equal to the threshold amount of residue. In at least one embodiment, the method 1032 can include generating, by the machine, the different geometrical distribution with a minimum in-line distance between the first and second non-impulsive sources such that, for the different geometrical distribution, the third and fourth amounts of residue are less than or equal to the threshold amount of residue. In at least one embodiment, the method 1032 can include generating, by the machine, the different geometrical distribution with a minimum depth difference between the first and second non-impulsive sources such that, for the different geometrical distribution, the third and fourth amounts of residue are less than or equal to the threshold amount of residue. In at least one embodiment, the method 1032 can include generating, by the machine, the different geometrical distribution with a minimum cross-line distance between the first and second non-impulsive sources such that, for the different geometrical distribution, the third and fourth amounts of residue are less than or equal to the threshold amount of residue.

In at least one embodiment, the proposed geometrical distribution can include a third non-impulsive source. Performing the near-field-to-notional computation comprises performing the near-field-to-notional computation to yield a computed notional output of the third non-impulsive source. The method 1032 can include determining, by the machine and for the proposed geometrical distribution, whether the computed notional output of the first non-impulsive source has a third amount of residue, from the third non-impulsive source and relative to the amount of energy of the first non-impulsive source at the operating frequency band of the first non-impulsive source, greater than the threshold amount of residue and determining, by the machine and for the proposed geometrical distribution, whether the computed notional output of the second non-impulsive source has a fourth amount of residue, from the third non-impulsive source and relative to the amount of energy of the second non-impulsive source at the operating frequency band of the second non-impulsive source, greater than the threshold amount of residue. The method 1032 can include determining, by the machine and for the proposed geometrical distribution, whether the computed notional output of the third non-impulsive source has a fifth amount of residue, from the first non-impulsive source relative to the amount of energy of the third non-impulsive source at the operating frequency band of the third non-impulsive source, greater than the threshold amount of residue and determining, by the machine and for the proposed geometrical distribution, whether the computed notional output of the third non-impulsive source has a sixth amount of residue, from the second non-impulsive source and relative to the amount of energy of the third non-impulsive source at the operating frequency band of the third non-impulsive source, greater than the threshold amount of residue.

In at least one embodiment, the method 1032 can include determining, by the machine, a respective geometrical position of a first near-field receiver corresponding to the first non-impulsive source and a second near-field receiver corresponding to the second non-impulsive source. The respective geometrical positions of the first and second near-field receivers can be a same distance from the first and second non-impulsive sources.

In accordance with at least one embodiment of the present disclosure, a geophysical data product may be produced or manufactured. Geophysical data may be obtained and stored on a non-transitory, tangible machine-readable medium. The geophysical data product may be produced by processing the geophysical data offshore or onshore either within the United States or in another country. If the geophysical data product is produced offshore or in another country, it may be imported onshore to a facility in the United States. A proposed geometrical distribution for a first non-impulsive source and a second non-impulsive source of a source array can be received. A near-field-to-notional computation can be performed based on the proposed geometrical distribution to yield a computed notional output of the first non-impulsive source and a computed notional output of the second non-impulsive source. Whether the computed notional output of the first non-impulsive source has a first amount of residue, from the second non-impulsive source and relative to an amount of energy of the first non-impulsive source at the operating frequency band of the first non-impulsive source, greater than a threshold amount of residue can be determined. Whether the computed notional output of the second non-impulsive source has a second amount of residue, from the first non-impulsive source and relative to an amount of energy of the second non-impulsive source at the operating frequency band of the second non-impulsive source, greater than the threshold amount of residue can be determined. An indication whether either of first or second amounts of residue is less than or equal to the threshold amount of residue can be provided. Responsive to providing an indication that the first and second amounts of residue are less than or equal to the threshold amount of residue, geophysical data can be obtained using the source array and the geophysical data can be recorded on one or more non-transitory machine-readable media, thereby creating the geophysical data product. In some instances, once onshore in the United States, geophysical analysis may be performed on the geophysical data product. In some instances, geophysical analysis may be performed on the geophysical data product offshore.

Figure 11:
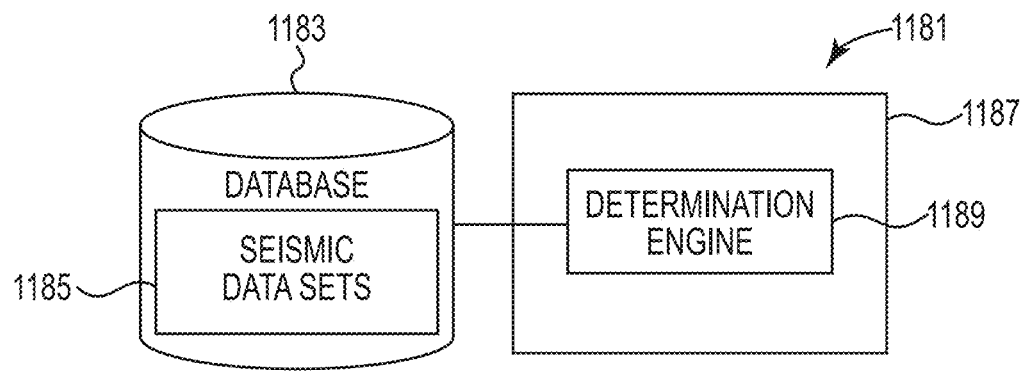
FIG. 11 illustrates an exemplary embodiment of a system for determining geometrical distributions for non-impulsive sources based on operating frequency bands and strengths of the non-impulsive sources.

FIG. 11 illustrates an exemplary embodiment of a system 1181 for determining geometrical distributions of non-impulsive sources based on frequency bands and strengths of the non-impulsive sources. The system 1181 can include a database 1183, a subsystem 1187, and/or a number of engines, such as a determination engine 1189. The subsystem 1187 can be analogous to the controller 119 illustrated in FIG. 1 in at least one embodiment. The subsystem 1187 and engines can be in communication with the database 1183 via a communication link. The database can store seismic data sets 1185. The seismic data sets 1185 can include simulated and measured near-field recordings of non-impulsive sources, among other seismic data sets.

The system 1181 can include more or fewer engines than illustrated to perform the various functions described herein. The system 1181 can represent program instructions and/or hardware of a machine such as the machine 1292 referenced in FIG. 12, etc. As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines can include a combination of hardware and program instructions that is configured to perform a number of functions described herein. The program instructions, such as software, firmware, etc., can be stored in a memory resource such as a machine-readable medium, etc., as well as hard-wired program such as logic. Hard-wired program instructions can be considered as both program instructions and hardware.

The determination engine 1189 can include a combination of hardware and program instructions that is configured to receive a first geometrical position of a first non-impulsive source relative to a second geometrical position of a second non-impulsive source of a source array. The determination engine 1189 can be configured to whether a computed notional output of the first non-impulsive source at the first geometrical position has at most a first amount of residue from the second non-impulsive source at frequencies outside an operating frequency band of the first non-impulsive source and determine whether a computed notional output of the second non-impulsive source at the second geometrical position has at most a second amount of residue from the first non-impulsive source at frequencies outside an operating frequency band of the second non-impulsive source. The first amount of residue and the second amount of residue can be based on a threshold amount of residue.

In at least one embodiment, the first amount of residue can be based on an amount of energy within the operating frequency band of the first non-impulsive source and the second amount of residue is based on an amount of energy within the operating frequency band of the second non-impulsive source. In at least another embodiment, the determination engine 1189 can be configured to receive the threshold amount of residue as a user-defined value. The second non-impulsive source can be configured to operate outside the operating frequency band of the first non-impulsive source.

Although not illustrated in FIG. 11, the subsystem 1187 can include an optimization engine configured to, determine a third geometrical position of the first non-impulsive source relative to the second geometrical position of the second non-impulsive source in response to a determination that the computed notional output of the first non-impulsive source has at most the first amount of residue and the computed notional output of the second non-impulsive source has at most the second amount of residue. The third geometrical position of the first non-impulsive source can be closer to the second geometrical position of the second non-impulsive source than the first geometrical position of the first non-impulsive source. The third geometrical position of the first non-impulsive source can be closer to the second geometrical position of the second non-impulsive source by reducing at least one of: a depth between the first and second non-impulsive sources, a cross-line position of the second non-impulsive source relative to the first non-impulsive source, and an in-line position of the second non-impulsive source relative to the first non-impulsive source.

Figure 12:
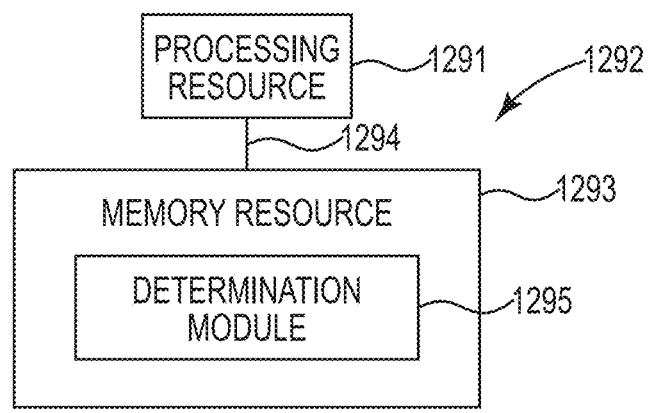
FIG. 12 illustrates an exemplary embodiment of a machine for determining geometrical distributions for non-impulsive sources based on operating frequency bands and strengths of the non-impulsive sources.

FIG. 12 illustrates an exemplary embodiment of a machine 1292 for determining geometrical distributions of non-impulsive sources based on frequency bands and strengths of the non-impulsive sources. The machine 1292 can utilize software, hardware, firmware, and/or logic to perform a number of functions. The machine 1292 can be a combination of hardware and program instructions configured to perform a number of functions and/or actions. The hardware, for example, can include a number of processing resources 1291 and a number of memory resources 1293, such as a machine-readable medium or other non-transitory memory resources 1293. The memory resources 1293 can be internal and/or external to the machine 1292, for example, the machine 1292 can include internal memory resources and have access to external memory resources. The program instructions, such as machine-readable instructions, can include instructions stored on the machine-readable medium to implement a particular function. The set of machine-readable instructions can be executable by one or more of the processing resources 1291. The memory resources 1293 can be coupled to the machine 1292 in a wired and/or wireless manner. For example, the memory resources 1293 can be an internal memory, a portable memory, a portable disk, and/or a memory associated with another resource, for example, enabling machine-readable instructions to be transferred and/or executed across a network such as the Internet. As used herein, a "module" can include program instructions and/or hardware, but at least includes program instructions.

The memory resources 1293 can be non-transitory and can include volatile and/or non-volatile memory. Volatile memory can include memory that depends upon power to store data, such as various types of dynamic random-access memory among others. Non-volatile memory can include memory that does not depend upon power to store data. Examples of non-volatile memory can include solid state media such as flash memory, electrically erasable programmable read-only memory, phase change random access memory, magnetic memory, optical memory, and/or a solid-state drive, etc., as well as other types of non-transitory machine-readable media.

The processing resources 1291 can be coupled to the memory resources 1293 via a communication path 1294. The communication path 1294 can be local or remote to the machine 1292. Examples of a local communication path 1294 can include an electronic bus internal to a machine, where the memory resources 1293 are in communication with the processing resources 1291 via the electronic bus. Examples of such electronic buses can include Industry Standard Architecture, Peripheral Component Interconnect, Advanced Technology Attachment, Small Computer System Interface, Universal Serial Bus, among other types of electronic buses and variants thereof. The communication path 1294 can be such that the memory resources 1293 are remote from the processing resources 1291, such as in a network connection between the memory resources 1293 and the processing resources 1291. That is, the communication path 1294 can be a network connection. Examples of such a network connection can include a local area network, wide area network, personal area network, and the Internet, among others.

As shown in FIG. 12, the machine-readable instructions stored in the memory resource 1293 can be segmented into a number of modules, such as the determination module 1295, that when executed by the processing resource 1291 can perform a number of functions. As used herein, a module includes a set of instructions included to perform a particular task or action. The number of modules can be sub-modules of other modules. For example, an optimization module (not shown in FIG. 12) can be a sub-module of the determination module 1295. Furthermore, the number of modules can comprise individual modules separate and distinct from one another. Examples are not limited to the specific module 1295 illustrated in FIG. 12.

Each of the number of modules can include program instructions and/or a combination of hardware and program instructions that, when executed by the processing resources 1291, can function as a corresponding engine as described with respect to FIG. 11. For example, the determination module 1295 can include program instructions and/or a combination of hardware and program instructions that, when executed by the processing resources 1291, can function as the determination engine 1189.

In at least one embodiment, the machine 1292 can include instructions executed by the processing resource 1291 to determine whether a respective computed notional output of a first non-impulsive source, a second non-impulsive source, and a third non-impulsive source of a source array positioned according to a geometrical distribution in 3-D space has at most a relative threshold amount of residue from others of the first, second, and third non-impulsive sources. The threshold amount of residue can be relative to an amount of energy of a respective frequency spectrum of the respective non-impulsive source within an operating frequency band of the respective non-impulsive source.

In at least one embodiment, the machine 1292 can include instructions executed by the processing resource 1291 to determine a respective threshold amount of residue for each of the first, second, and third non-impulsive sources based on an inversion of measured near-field frequency spectra of the first, second, and third non-impulsive sources and the relative threshold amount of residue. In at least another embodiment, the machine 1292 can include instructions executed by processing resource 1291 to determine a respective threshold amount of residue for each of the first, second, and third non-impulsive sources based on an inversion of modeled near-field frequency spectra of the first, second, and third non-impulsive sources and the relative threshold amount of residue. As used herein, "modeled near-field frequency spectra" of non-impulsive sources refer to near-field frequency spectra obtained from simulated actuations of the non-impulsive sources whereas "measured near-field frequency spectra" refer to near-field frequency spectra obtained from actual actuations of the non-impulsive sources.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   receiving, by a machine, a proposed geometrical distribution for a first non-impulsive source and a second non-impulsive source of a source array;
   performing, by the machine and for the proposed geometrical distribution, a near-field-to-notional computation to yield a computed notional output of the first non-impulsive source and a computed notional output of the second non-impulsive source;
   determining, by the machine and for the proposed geometrical distribution, whether the computed notional output of the first non-impulsive source has a first amount of residue, from the second non-impulsive source and relative to an amount of energy of the first non-impulsive source at the operating frequency band of the first non-impulsive source, greater than a threshold amount of residue;

determining, by the machine and for the proposed geometrical distribution, whether the computed notional output of the second non-impulsive source has a second amount of residue, from the first non-impulsive source and relative to an amount of energy of the second non-impulsive source at the operating frequency band of the second non-impulsive source, greater than the threshold amount of residue; and providing, by the machine, an indication whether either of the first or second amounts of residue is less than or equal to the threshold amount of residue.

2. The method of claim 1, further comprising, responsive to providing an indication that the first and second amounts of residue are less than or equal to the threshold amount of residue, performing a marine survey using the proposed geometrical distribution for the first and second non-impulsive sources.

3. The method of claim 1, wherein the near-field-to-notional computation is based on an inversion of a modeled output of the first non-impulsive source, and
wherein the method further comprises determining, by the machine, the amount of energy of the first non-impulsive source at the operating frequency band of the first non-impulsive source based on the computed notional output of the first non-impulsive source.

4. The method of claim 1, wherein the near-field-to-notional computation is based on an inversion of a measured output of the first non-impulsive source, and
wherein the method further comprises determining, by the machine, the amount of energy of the first non-impulsive source at the operating frequency band of the first non-impulsive source based on the computed notional output of the first non-impulsive source.

5. The method of claim 1, wherein the first and second non-impulsive sources are configured to be operated at different frequencies.

6. The method of claim 1, further comprising:
responsive to providing an indication that the first and second amounts of residue are less than or equal to the threshold amount of residue:
generating, by the machine, a different geometrical distribution for the first and second non-impulsive sources with a reduced distance between the first and second non-impulsive sources;
performing, by the machine and for the different geometrical distribution, a different near-field-to-notional computation to yield a different computed notional output of the first non-impulsive source and a different computed notional output of the second non-impulsive source;
determining, by the machine and for the different geometrical distribution, whether the different computed notional output of the first non-impulsive source has a third amount of residue, from the second non-impulsive source and relative to the amount of energy of the first non-impulsive source at the operating frequency band of the first non-impulsive source, greater than the threshold amount of residue; and
determining, by the machine and for the different geometrical distribution, whether the different computed notional output of the second non-impulsive source has a fourth amount of residue, from the first non-impulsive source and relative to the amount of energy of the second non-impulsive source at the operating frequency band of the second non-impulsive source, greater than the threshold amount of residue.

7. The method of claim 6, further comprising generating, by the machine, the different geometrical distribution with a minimum distance between the first and second non-impulsive sources such that, for the different geometrical distribution, the third and fourth amounts of residue are less than or equal to the threshold amount of residue.

8. The method of claim 6, further comprising generating, by the machine, the different geometrical distribution with a minimum in-line distance between the first and second non-impulsive sources such that, for the different geometrical distribution, the third and fourth amounts of residue are less than or equal to the threshold amount of residue.

9. The method of claim 6, further comprising generating, by the machine, the different geometrical distribution with a minimum depth difference between the first and second non-impulsive sources such that, for the different geometrical distribution, the third and fourth amounts of residue are less than or equal to the threshold amount of residue.

10. The method of claim 6, further comprising generating, by the machine, the different geometrical distribution with a minimum cross-line distance between the first and second non-impulsive sources such that, for the different geometrical distribution, the third and fourth amounts of residue are less than or equal to the threshold amount of residue.

11. The method of claim 1, wherein the proposed geometrical distribution includes a third non-impulsive source,
wherein performing the near-field-to-notional computation comprises performing the near-field-to-notional computation to yield a computed notional output of the third non-impulsive source, and
wherein the method further comprises:
determining, by the machine and for the proposed geometrical distribution, whether the computed notional output of the first non-impulsive source has a third amount of residue, from the third non-impulsive source and relative to the amount of energy of the first non-impulsive source at the operating frequency band of the first non-impulsive source, greater than the threshold amount of residue;
determining, by the machine and for the proposed geometrical distribution, whether the computed notional output of the second non-impulsive source has a fourth amount of residue, from the third non-impulsive source and relative to the amount of energy of the second non-impulsive source at the operating frequency band of the second non-impulsive source, greater than the threshold amount of residue;
determining, by the machine and for the proposed geometrical distribution, whether the computed notional output of the third non-impulsive source has a fifth amount of residue, from the first non-impulsive source relative to the amount of energy of the third non-impulsive source at the operating frequency band of the third non-impulsive source, greater than the threshold amount of residue; and
determining, by the machine and for the proposed geometrical distribution, whether the computed notional output of the third non-impulsive source has a sixth amount of residue, from the second non-impulsive source and relative to the amount of energy of the third non-impulsive source at the operating frequency band of the third non-impulsive source, greater than the threshold amount of residue.

12. The method of claim 1, further comprising determining, by the machine, a respective geometrical position of a first near-field receiver corresponding to the first non-impulsive source and a second near-field receiver corresponding to the second non-impulsive source,
   wherein the respective geometrical positions of the first and second near-field receivers are a same distance from the first and second non-impulsive sources.

13. A method to manufacture a geophysical data product, the method comprising:
   receiving a proposed geometrical distribution for a first non-impulsive source and a second non-impulsive source of a source array;
   performing a near-field-to-notional computation to yield a computed notional output of the first non-impulsive source and a computed notional output of the second non-impulsive source;
   determining, whether the computed notional output of the first non-impulsive source has a first amount of residue, from the second non-impulsive source and relative to an amount of energy of the first non-impulsive source at the operating frequency band of the first non-impulsive source, greater than a threshold amount of residue;
   determining whether the computed notional output of the second non-impulsive source has a second amount of residue, from the first non-impulsive source and relative to an amount of energy of the second non-impulsive source at the operating frequency band of the second non-impulsive source, greater than the threshold amount of residue and
   providing an indication whether either of the first or second amounts of residue is less than or equal to the threshold amount of residue; and
   responsive to providing an indication that the first and second amounts of residue are less than or equal to the threshold amount of residue:
      obtaining geophysical data using the source array; and
      recording the geophysical data on one or more non-transitory machine-readable media, thereby creating the geophysical data product.

* * * * *